United States Patent Office 3,155,512
Patented Nov. 3, 1964

3,155,512
LIGHT-SENSITIVE DIAZOTYPE COMPOSITIONS
Henri Gerard Jean De Boer, Delft, Netherlands, assignor to N.V. Lichtdrukpapierfabriek de Atlas, Delft, Netherlands, a corporation of the Netherlands
No Drawing. Filed June 26, 1961, Ser. No. 119,284
Claims priority, application Great Britain, June 27, 1960, 22,445/60
10 Claims. (Cl. 96—91)

British Patents 774,925, 785,120, and 785,222 disclose methods for the preparation of azo dyestuffs containing 2 reactive chlorine atoms attached to a triazine ring. In these patents the triazine ring is linked to the coupling component. Dyestuffs of this type are capable of reacting with cellulose under certain circumstances, thus producing very fast dyed products.

The components described in the above patents, however, are unsuitable for diazotype purposes, because the diazo components are not light-sensitive, and because the coupling components react with vigorously coupling diazo compounds only. The same applies to the components referred to in British Patents 775,308 and 780,591, in which the dyes contain a triazine ring linked to the diazo component.

British patent application No. 24,484/59 mentions condensation products of cyanuric chloride with amino phenols and polyphenols which, also after further condensation with polymeric substances, will react with the diazo compounds that are conventional in the diazotype method. As these condensation products are capable of associating themselves with fibres, perfectly fast colour images are obtained therewith.

Light-sensitive diazo compounds which contain one or two reactive halogen atoms linked to a triazine ring are unknown in the art.

If the well-known diazotype compounds of the type

(in which A represents an aromatic ring system which in addition to a diazo group may contain substituents, and in which R represents hydrogen, alkyl, aryl or aralkyl) is reacted with cyanuric chloride, the behaviour of the resultant compounds is not to be predicted, as the introduction of a cyanuric radical will strongly influence the absorption spectra, the sensitiveness to light, the coupling reactivity, and the stability at elevated temperatures.

Surprisingly, it has now been found, that the compounds of the type

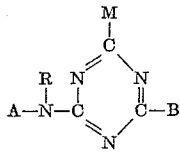

in which A represents an aromatic ring system which in addition to a diazo group may contain substituents; R represents hydrogen, alkyl, aryl or aralkyl; M represents the residue obtained by removing a reactive hydrogen atom from a macromolecular substance containing at least one reactive hydrogen atom; B represents a halogen atom, a group

the residue obtained by removing a reactive hydrogen atom from a macromolecular substance containing at least one reactive hydrogen atom, one of the groups OH, $NH_2$, $NHSO_3H$, NH-alkyl, NH-aryl, O-alkyl-O-aryl, O-aralkyl, NH-aralkyl, N-dialkyl, N-diaryl, N-alkyl, aryl, possess the desired qualities. As diazonium compounds they are very sensitive to light, stable at elevated temperatures, so that the condensation with macromolecular substances containing reactive hydrogen atoms, such as cellulose (paper), casein, wool, silk, polyvinyl alcohol, and polyamides is possible, and also after the condensation with macromolecular substances containing reactive hydrogen atoms they will sufficiently rapidly react with most of the conventional coupling components, and will remain light-sensitive then. Of the substituents which may occur in the nucleus A, especially alkoxy, aryloxy, aralkyloxy, alkyl, and carboxy groups and halogen atoms are of importance.

The condensation product of 1 mole of cyanuric chloride with 1 mole of 4-amino-2,5-diethoxybenzene-1-diazoniumchloride (and the corresponding diazosulphonate respectively) has for example very favourable properties.

The above-described condensation products of polymers with diazonium compounds containing a triazine ring are of great value for the preparation of diazotype material. It is immaterial in this respect, whether the coupling component is already contained in the diazotype material, or whether it is introduced after the exposure necessary for forming an image.

Obviously, the material obtained in these manners has outstanding qualities by virtue of the chemical bond with fibres by means of the triazine ring.

The most important thereof are:

(a) The image formed is perfectly fast;
(b) During the wet development the so-called "bleeding" cannot occur;
(c) The print can be rinsed after development, so that e.g. the yellowing caused by the coupling component can be prevented;
(d) The migration of the diazo component and of the dyestuff formed thereof later on, is impossible;
(e) Both the diazo and the coupling component may contain sulphonic acid, or other water-solubilizing substances, by virtue of which a much wider choice of the components is possible.

Example 1

50 grams of ice is stirred into a solution of 7.4 grams of cyanuric chloride in 80 cc. of acetone. To the resultant suspension of cyanuric chloride a solution of 13.8 grams of 4-amino-2,5-diethoxybenzene-1-diazosulphonate in 150 cc. of water is added dropwise in the course of 45 minutes, the mixture being stirred and the temperature being maintained between 0° and 5° C. After the addition is completed the mixture is stirred for another 60 minutes and is then neutralized by adding dropwise about 20 cc. of a 10% sodium carbonate solution. At the above temperature the reaction mixture is stirred for another 150 minutes, after which the precipitate is filtered off and dried in vacuo.

A suspension of 1 gram of the condensation product which is thus obtained in 20 cc. of water is added to a solution of 2 grams of casein in 80 cc. of 4% formic acid. After boiling for 5 minutes the condensation has come to an end and at the same time the diazosulphonate has been converted into the diazonium compound. The formed precipitate is dissolved by the addition of acetone. Thereafter the acetone is removed by careful evaporation, so that a colloidal solution of the condensation product of the casein with the diazonium compound is obtained. With this solution paper is prepared and dried. Subsequently the paper is prepared with a solution containing 1 gram of 2,3-dihydroxy-naphthalene-6-sulphonic acid, 2 grams of citric acid, and 3 grams of zinc chloride in 100 cc. of water and is dried again.

When exposed under a tracing and developed with humid ammonia vapour, the diazotype material thus obtained produces a fine blue print which is entirely fast.

*Example 2*

Some strips of cellophane are dipped into a suspension of 0.5 gram of the condensation product of 4-amino-2,5-diethoxybenzene-1-diazosulphonate with cyanuric chloride in 50 millilitres of water, the suspension also containing 2 grams of sodium bicarbonate and 10 grams of urea.

Subsequently the suspension is boiled for a few minutes, after which the cellophane strips are removed, rinsed with water, and dried. After this treatment the strips are boiled in a 4% formic acid solution for a few minutes. The material then is rinsed, dried and exposed to form an image.

The exposed material is developed in a solution containing 0.5 gram of 2,3-dihydroxynaphthalene-6-sulphonic acid and 2 grams of sodium acetate per 100 millilitres of water.

The image which is thus obtained shows a fine blue colour and turns out to be entirely fast.

*Example 3*

Strips of nylon are prepared with a solution of 0.5 gram of 2,3-dihydroxynaphthalene-6-sulphonic acid in 50 millilitres of 4% formic acid by heating the whole in a water bath of 50° C. for 30 minutes. The nylon strips are removed, rinsed with water, and dried.

A suspension of 0.5 gram of the condensation product of 4-amino-2,5-diethoxybenzene-1-diazosulphonate with cyanuric chloride in 50 millilitres of a 4% formic acid solution is boiled for some minutes, after which the nylon strips are dipped into the suspension thus obtained. After boiling for another minute the nylon strips are removed from the bath, rinsed with water, dried, and exposed for the formation of an image. The resultant diazo image can then be developed with ammonia vapour.

The print thus obtained shows a violet colour, and turns out to be perfectly fast.

*Example 4*

Since the condensation product of, for example, 4-amino-2,5-diethoxybenzene-1-diazo-sulphonate is hardly soluble in water, it would be worth trying to make this product soluble by a novel condensation, for example, by means of sodium taurate ($H_2N-CH_2-CH_2-SO_3Na$).

It appears, that at about 40° C. this condensation proceeds smoothly. The readily water soluble product thus obtained, can then successfully be further condensed with casein at a higher temperature, while at the same time the diazosulphonate can be converted into a diazonium compound.

The surprising thing is, that, despite the presence of a sulphonic acid group, the resultant polymeric diazonium compound is highly light sensitive, and has a remarkably good capacity of coupling with the azo components that are conventional in the diazotype method.

To a suspension of the condensation product, formed from 1.85 grams of cyanuric chloride and 3.45 grams of 4 - amino - 2,5-diethoxybenzene-1-diazosulphonate in a water-acetone mixture an equivalent quantity of sodium taurate is added. While the mixture is being thoroughly stirred, the temperature is raised by heating to about 40° C., and finaly the required amount of sodium carbonate is added.

The 1 gram of casein is dissolved in 40 millilitres of a 5% formic acid solution, and e.g. 0.3 millimole of the above water-soluble condensation product is added to this solution. A yellow-coloured precipitate forms. Subsequently the mixture is heated, the precipitate dissolving again at about 80° C. The solution is boiled for about 5 minutes.

Paper prepared with this solution produces a beautifully rose print on a perfectly blank ground after exposure under tracing and coupling with resorcinol. The image which is thus formed is fast.

*Example 5*

1 mole of 3-methoxy-4-aminobenzenediazosulphonate is condensed at a temperature between 0° and 5° C. with 1 mole of cyanuric chloride. The condensation product formed is filtered off, washed with water and subsequently dried. 1 gram of this dried product is mixed with a solution of 2 grams of casein in 100 cc. of a 4% formic acid solution. A coarse precipitate will form, which after the addition of 40 cc. of acetone will dissolve. The solution is heated for 45 minutes at a temperature ranging between 55 and 60° C. By a careful evaporation in vacuo the acetone is removed from the mixture. A coarse chrome yellow precipitate will form. After the addition of 20 cc. of a 35% hydrochloric acid solution a portion of the precipitate will dissolve, the residue is suspended. Subsequently, 0.5 gram of potassium bromate are added and the mixture is kept for 30 minutes at 20° C. Next, the solution is kept for ten minutes under a vacuum of 50 mm. of mercury, the excess chlorine escaping. With the resultant suspension of diazonium caseinate paper is prepared on one side. Subsequently, the photosensitive side of the paper is prepared with a solution of 2 grams of 2,3-dioxinaphthalene-6-sodium-sulphonate, 2 grams of citric acid, 4 grams of zinc chloride and 3 grams of paradurol (i.e. a mixture of 1,3,5- and 1,3,6-naphthalene-trisodiumsulphonate) in 100 cc. of water. The resultant diazotype material after being exposed under a tracing and developed in ammonia vapour produces strongly purplish-red coloured images on a white background. The images thus obtained are water-resistant, because after a residence time of a few minutes in boiling water a material so developed has lost only little of its dye.

If instead of the above-mentioned 2,3-dihydroxy-naphthalene-6-sodiumsulphonate (=component C), other azo components such as e.g. resorcinol (=component R) or 1-(4-sulphophenyl)-3-methylpyrazolone-5 (=component P) is used yellowish-brown water-resistant images are obtained after exposure for the formation of an image and development in ammonia vapour (so called dry development). The above-mentioned photo-sensitive side of the paper, however, may also be prepared with a solution containing e.g. 0.3 gram of tartaric acid and 0.3 gram of zinc chloride per 100 cc. of water, whereupon after exposure and development with a solution containing 0.70 gram of potassium hydroxide, 5.7 grams of potassium tetraborate, 1.7 grams of thiourea, 2 grams of phloroglucinol (=component F), 0.1 gram of the sodium salt of isopropylnaphthalene-sulphonic acid and 3 grams of paradurol per 100 cc. of water, water-resistant yellowish-brown images on a colorless background are obtained (so called wet development).

The azo components used here will be called component C, component R, component P and component F, respectively, in the following examples.

*Example 6*

1 mole of 3-methyl-4-N-ethylamino-benzenediazosulphonate is condensed at a temperature ranging between 0 and 5° C. with 1 gram molecule of cyanuric chloride. The condensation product is filtered off, washed with water and dried in vacuo over phosphorpentoxide.

1 gram of the dry condensation product is subsequently dissolved in 20 cc. of water and 20 cc. of acetone. This solution is added to a solution of 2 grams of casein in 60 cc. of a 6% formic acid solution. This mixture is heated at about 65° C. for 45 minutes and is subsequently cooled to about 10° C. The suspension is stirred for 30 minutes after 0.3 gram of potassium bromate have been added thereto. After diluting the suspension with 100 cc. of water it is subjected to a homogenizing treatment whereupon paper is prepared on one side with this suspension.

The photo-sensitive material thus obtained may then, just as has been described in Example 5, be provided with an azo component, an acid, a stabilizer, etc., water-resistant dye images being obtained after exposure and development with ammonia vapour.

If component C ind the dry development is used a violet image results, while if component F is used and the wet development is applied a yellowish-brown image will result.

Example 7

1 mole of 3-methoxy-4-amino-benzenediazosulphonate is condensed with 1 mole of cyanuric chloride at a temperature ranging between 0 and 5° C. The condensation product after being filtered off is washed with water and dried. 1 gram of the dry condensation product is dissolved in 25 cc. of acetone and 25 cc. of water. This solution is added to a solution of 10 grams of urea and 2.5 grams of sodium bicarbonate in 50 cc. of water. In this solution some strips of cellophane having a thickness of 0.03 mm. are submerged and kept in the solution for 60 hours at room temperature. Subsequently, the strips are rinsed with cold water and after drying they are submerged in a bath containing 100 cc. of water, 10 cc. of concentrated hydrochloric acid and 0.3 gram of potassium bromate. After about 1 minute, the strips are taken out of the bath, thoroughly rinsed and dried in the air. The resultant photo-sensitive material will produce reddish violet and yellow waterproof images if the components C and P are used and if the dry development method is applied, while with component F and the wet development method water-resistant orangy-yellow images are formed.

Example 8

2 moles of 3-methoxy-4-amino-benzenediasulphonate are condensed with 1 mole of cyanuric chloride at a temperature ranging between 0 and 5° C., one chlorine atom being replaced, whereupon subsequently at 45° C. a second chlorine atom is replaced.

The liquid is cooled to about 0° C. The solid substance is removed by filtering and is washed with water. The precipitate is dissolved in 2.5 litres of a 5% hydrochloric acid solution. To this solution 100 grams of zinc chloride and 55 grams of potassium bromate are added with stirring. A thick yellow precipitate will form which is filtered off after 30 minutes and is washed with water. After drying over phosphorpentoxide the diazonium compound is obtained as the zinc chloride double salt (yield 58%). 1 gram of the compound obtained is dissolved in 20 cc. of water and 20 cc. of acetone. This solution is added to a solution of 2 grams of casein in 60 cc. of a 6% formic acid solution. After heating the solution it is used for preparing paper therewith on one side.

The resultant photo-sensitive material if treated with the components C, R and P will produce violet, brownish-yellow and yellowish-brown water-resistant dye images respectively after development according to the dry method, while with component F and according to the wet development method water-resistant brown images result.

Example 9

1 mole of 3-methoxy-4-aminobenzene sulphonate is condensed with 1 mole of cyanuric chloride at a temperature ranging between 0 and 5° C. Subsequently 1 mole of soda is added and the mixture is heated for a short time at elevated temperatures, a second chlorine atom of this cyanuric chloride being replaced by a hydroxyl group. Subsequently, the above-mentioned compound condensed with casein is converted in a known manner at elevated temperature in an acid medium into a diazonium compound with which paper is again prepared then.

The resultant photo-sensitive material if treated with components C, R and P and developed according to the dry method produces lilac, yellowish-brown and orangy-brown water-resistant dye images respectively while if treated with component F and developed according to the wet method water-resistant brown images are formed.

Example 10

1 mole of 2,5-diethoxy-4-amino-benzenediazosulphonate is condensed with 1 mole of cyanuric chloride at a temperature ranging between 0–5° C. Of the condensation product one chlorine atom is replaced by an OH group by heating the substance for a short time with soda in an aqueous solution. After the termination of the reaction the solution is cooled and the precipitate is filtered off, washed with water and dried. One gram of the condensation product is dissolved in 25 cc. of acetone and 25 cc. of water. This liquid is added to a solution of 2 grams of casein in 50 cc. of 6% formic acid. A precipitate will form. The solution is subsequently heated for 50 minutes at 70° C. After cooling 5 cc. of concentrated hydrochloric acid and 0.3 gram of potassium bromate are added to the liquid. After the solution has been stirred for 30 minutes at room temperature 100 cc. of water is added. Subsequently the precipitate is dispersed through the solution by means of a homogenizer. Paper is prepared with the resultant dispersion. The photo-sensitive material thus prepared if treated with components C, R or P and developed according to the dry method produces blue, reddish-brown and orange images respectively, while if treated with component F and developed according to the wet method reddish-brown images are formed. All of these images are water-resistant.

Example 11

1 mole of 2,5-diethoxy-4-aminobenzenediazosulphonate is condensed with 1 mole of cyanuric chloride at a temperature ranging between 0–5° C. After the condensation has been terminated 1 mole of the sodium salt of sulphanilic acid is added and the condensation is continued at 50° C. A limpid liquid results which, after being treated with activated carbon, is filtered. The condensation product is removed from the filtrate by adding 15% of sodium chloride thereto and by subsequently cooling the solution to 0° C. After filtering off the condensation product and washing it with alcohol it is dried in vacuo. 1 gram of the condensation product is dissolved in 50 cc. of water. Said liquid is added to a solution of 2 grams of casein in 50 cc. of 6% formic acid. A precipitate is formed. After boiling for some time the solution is cooled. Subsequently 5 cc. of concentrated hydrochloric acid and 0.3 gram of potassium bromate are added. After stirring for 30 minutes the precipitate is dispersed by means of a homogenizer. Paper is prepared with the dispersion obtained. The resultant photo-sensitive material if treated with diazo components C, R and P and developed according to the dry method will produce blue, brick-red and pink water-resistant images respectively, while if treated with component F and developed according to the wet method water-resistant red images are formed.

Example 12

1 mole of 2,5-diethoxy-4-amino-benzenediazosulphonate is condensed with 1 mole of cyanuric chloride at a temperature ranging between 0 and 5° C. Subsequently, the condensation is continued with 1 mole of N-methyltaurine at 55° C. After filtering off and washing the solid matter said matter is dried in vacuo over phosphorpentoxide. The yield is 94%. 1 gram of the diazosulphonate obtained is dissolved in 25 cc. of acetone and 50 cc. of water and added to a solution of 2 grams of casein 60 cc. of 6% formic acid. A fibrous yellow precipitate is formed. After condensation at elevated temperatures 5 cc. of concentrated hydrochloric acid and 0.3 gram of potassium bromate are added to the liquid. After 30 minutes stirring 100 cc. of water are added. The precipitate is suspended by means of a homogenizer. Paper is prepared with the suspension obtained. The photo-sensitive material thus obtained if treated with the azo components C, R and P and developed according to the dry method produces violet, yellowish-brown and yellow water-resistant images, respectively while if treated with component F and developed according to the wet method water-resistant brown images are formed.

Instead of N-methyltaurine it is also possible to use for example N-methylsulphanilic acid, metanilic acid, p-nitrophenol (so phenols), alcohols (e.g. ethylalcohol, benzylalcohol), ammonia, sulphaminic acid, etc. The condensation of such and of analogous substances was described in the literature more than 30 years ago.

*Example 13*

1 mole of 4-N-phenylamino-benzenediazosulphonate is condensed with 1 mole of cyanuric chloride at a temperature ranging between 0 and 5° C. The condensation product is converted by means of potassium bromate into the diazonium compound, which is isolated as the zinc chloride double salt and is dried in vacuo over phosphorpentoxide. 1 gram of the diazonium compound is dissolved in 25 cc. of water and 25 cc. of acetone. Said liquid is added to a solution of 2 grams of casein in 50 cc. of 6% formic acid. This liquid is heated and paper is prepared therewith. The photo-sensitive material thus obtained if treated with the azo components C, R and P and developed according to the dry method produces blue, brick-red and ochre water-resistant images respectively, while if treated with component F and developed according to the wet method water-resistant brown images are formed.

*Example 14*

1 mole of 4 - (4' - chlorophenylamino) - benzenediazosulphonate is condensed at 0° C. with 1 mole of cyanuric chloride. After being filtered off and washed the condensation product is dried. 0.5 gram of this product together with 1 gram of casein is dissolved in a mixture of 25 cc. of acetone, 75 cc. of water and 3 cc. of 8.5% formic acid, the solution being heated for one hour at 60° C. Subsequently the solution is cooled to room temperature and after the addition of 5 cc. of concentrated hydrochloric acid the diazosulphonate is converted by means of 150 milligrams potassium bromate into the diazonium compound. In a homogenizer the precipitate formed is dispersed. By means of the suspension obtained paper is prepared. The photo-sensitive material thus obtained if treated with the azo components C, R and P and developed according to the dry method produces blue, orange, red and yellowish-brown water-resistant images respectively, while if treated with component F and developed according to the wet method water-resistant brown images are formed.

*Example 15*

1 mode of 4-N-phenylamino-benzenediazosulphonate is condensed with 1 mole of cyanuric chloride at a temperature ranging between 0-5° C. After the termination of the condensation the product formed is filtered off, washed with water and dried in vacuum. 1 gram of the condensation product is dissolved in 25 cc. of water and 25 cc. of acetone. This liquid is added to a solution of 2 grams of casein in 50 cc. of 8% formic acid. A yellow precipitate is formed. The solution is heated for some time, whereupon 5 cc. of concentrated hydrochloric acid and 300 milligrams of potassium bromate are added. After stirring for some time the precipitate is dispersed in the solution. After 100 cc. of water have been added to this dispersion paper is prepared therewith. The photo-sensitive material thus obtained if treated with the azo components C, R and P and developed according to the dry method produces blue, yellowish-brown and orangy-red water-resistant images respectively, while if treated with component F and developed according to the wet method -water-resistant brown images are formed.

*Example 16*

1 mole of 4-N-(4'-methoxyphenyl amino)-anilin is diazotized and after being isolated as the zinc chloride double salt it is converted into the diazosulphonate.

1 mole of this diazosulphonate is condensed with 1 mole of cyanuric chloride at a temperature ranging between 0 and 5° C. The further course of things is entirely analogous to that in Example 14. The dye images formed also have substantially the same colours and are likewise water-resistant.

*Example 17*

1 mole of 4-aminobenzene diazosulphonate is condensed with 1 mole of cyanuric chloride at 0° C. The condensation product is filtered off, washed with water and dried in vacuo over phosphorpentoxide. 1 gram of the condensation product is dissolved in 25 cc. of acetone and 25 cc. of water. This liquid is added to a solution of 2 grams of casein and 50 cc. of water and 5 cc. of formic acid. A precipitate will form.

The solution is slightly heated for a rather long period, whereupon 5 cc. of concentrated hydrochloric acid and 300 milligrams of potassium bromate are added. After stirring the solution for 30 minutes at room temperature 100 cc. of water are added.

The precipitate is dispersed by means of a homogenizer. By means of the resultant dispersion paper is prepared. The photo-sensitive material thus obtained if treated with the azo components C, R and P and developed according to the dry method produces violet, brownish-yellow and yellow water-resistant images respectively, while if treated with the component F and developed according to the wet method water-resistant orangy-brownish images are formed.

*Example 18*

1 mole of 2,5-diethoxy-4-aminobenzenediazosulphonate is condensed with 1 mole of cyanuric chloride at 0–5° C.

The condensation product is further condensed with 1 mole of 4-aminobenzenediazosulphonate at 50° C. The resultant product, after being cooled, is filtered off, washed with water and dried. The yield is 80%.

1 gram of the condensation product is suspended in 25 cc. of water and 25 cc. of acetone. This suspension is added to a solution of 2 grams of casein in 50 cc. of 6% formic acid. A precipitate is formed. After heating the solution for 75 minutes at about 70° C. it is cooled. Subsequently 5 cc. of concentrated hydrochloric acid and 300 milligrams of potassium bromate are added. After 30 minutes stirring at room temperature 100 cc. of water are added and the precipitate is dispersed in the liquid by means of a homogenizer.

By means of the dispersion obtained paper is prepared. The resultant photo-sensitive material if treated with the azo components C, R and P and developed according to the dry method produces purple, orangy-brown and yellowish-brown water-resistant images, while with component F according to the wet method water-resistant reddish-brown images are formed.

I claim:

1. A process for preparing a light-sensitive diazo component useful in the preparation of diazotype prints which comprises reacting a compound of the formula

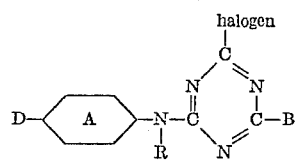

wherein
- A represents a member selected from the group consisting of phenylene, lower alkylphenylene, lower alkoxyphenylene and halogenphenylene, and
- D represents the diazo sulphonate group;
- R is selected from the group consisting of hydrogen, lower alkyl, aryl and aralkyl;
- B is a substituent selected from the group consisting of halogen, the group $$D-\underset{A}{\bigcirc}-N\underset{}{\overset{R}{\diagdown}}\ ;\ -NH-SO_3H,\ -OR_1\ \text{and}\ -N\underset{R_2}{\overset{R_1}{\diagdown}}$$

in which $R_1$ and $R_2$ each are selected from the group consisting of hydrogen, alkyl, sulpho-alkyl, aryl, sulpho-aryl, aralkyl and sulpho-aralkyl, with a member selected from the group consisting of cellulose, regenerated cellulose, casein, polyvinyl alcohol and polyamide in an aqueous medium at a temperature not higher than the boiling point of the solution and replacing the diazo sulphonate group by the diazo group.

2. A diazo component for the preparation of diazotype prints and having the formula $$D-\underset{A}{\bigcirc}-\underset{R}{N}-\underset{}{\overset{M}{\underset{C}{\diagup N\diagdown}}}\underset{N}{\overset{N}{\diagdown}}C-B$$

wherein
- A represents a member selected from the group consisting of phenylene, lower alkylphenylene, lower alkoxyphenylene and halogenphenylene, and
- D represents a diazosulfonate group,
- R is a member selected from the group consisting of hydrogen, lower alkyl, aryl and aralkyl,
- B is a substituent selected from the group consisting of halogen, the radical M, the group $$D-\underset{A}{\bigcirc}-N\underset{}{\overset{R}{\diagdown}}\ ,\ -NH.SO_3H,\ -OR_1\ \text{and}\ -N\underset{R_2}{\overset{R_1}{\diagdown}}$$

in which $R_1$ and $R_2$ each represent a member of the group consisting of hydrogen, alkyl, sulpho-alkyl, aryl, sulpho-aryl, aralkyl and sulpho-aralkyl, and M is the radical derived from a member selected from the group consisting of cellulose, regenerated cellulose, casein, polyvinyl alcohol and polyamide.

3. A diazo component for the preparation of diazotype prints and having the formula $$D-\underset{OC_2H_5}{\underset{|}{\bigcirc}}\overset{OC_2H_5}{-}-NH-C\underset{N}{\overset{N}{\diagdown}}C-B$$

wherein
- D represents a diazosulfonate group,
- B is a substituent selected from the group consisting of halogen, the radical M, the group $$D-\underset{}{\bigcirc}-N\underset{}{\overset{R}{\diagdown}}\ ,\ -NH.SO_3H,\ -OR_1\ \text{and}\ -N\underset{R_2}{\overset{R_1}{\diagdown}}$$

in which $R_1$ and $R_2$ each represent a member of the group consisting of hydrogen, alkyl, sulpho-alkyl, aryl, sulpho-aryl, aralkyl and sulpho-aralkyl;

and
M is the radical derived from casein.

4. A diazo component for the preparation of diazotype prints having the formula $$D-\underset{OC_2H_5}{\underset{|}{\bigcirc}}\overset{OC_2H_5}{-}-NH-C\underset{N}{\overset{N}{\diagdown}}C-N\underset{H}{\overset{}{\diagdown}}-\bigcirc-SO_3H$$

wherein
- D represents a diazosulfonate group, and
- M is the radical derived from casein.

5. A diazo component for the preparation of diazotype prints and having the formula $$D-\bigcirc-NH-C\underset{N}{\overset{N}{\diagdown}}C-NH-\bigcirc-D$$
$$\overset{OCH_3}{\phantom{xxxxx}}\overset{OCH_3}{\phantom{xxxxx}}$$

wherein
- D represents a diazosulfonate group, and
- M is the radical derived from casein.

6. A diazo component for the preparation of diazotype prints and having the formula $$D-\bigcirc-\underset{R}{N}-C\underset{N}{\overset{N}{\diagdown}}C-B$$

wherein
- D represents a diazosulfonate group, and
- M is the radical derived from casein,
- R is a member selected from the group consisting of hydrogen, lower alkyl, aryl and aralkyl,
- B is a substituent selected from the group consisting of halogen, the radical M, the group $$D-\bigcirc-N\underset{}{\overset{R}{\diagdown}}\ ,\ -NH.SO_3H,\ -OR_1\ \text{and}\ -N\underset{R_2}{\overset{R_1}{\diagdown}}$$

in which $R_1$ and $R_2$ each represent a member of the group consisting of hydrogen, alkyl, sulpho-alkyl, aryl, sulpho-aryl, aralkyl and sulpho-aralkyl.

7. A diazo component for the preparation of diazotype prints and having the formula $$D-\underset{C_2H_5}{\underset{|}{\bigcirc}}\overset{CH_3}{-}-N-C\underset{N}{\overset{N}{\diagdown}}C-B$$

wherein
- D represents a diazosulfonate group;
- M is the radical derived from a member selected from the group consisting of cellulose, regenerated cellulose, casein, polyvinyl alcohol and polyamide;
- B is a substituent selected from the group consisting of halogen, the radical M, the group $$D-\bigcirc-N\underset{}{\overset{R}{\diagdown}}\ ,\ -NH.SO_3H,\ -OR_1\ \text{and}\ -N\underset{R_2}{\overset{R_1}{\diagdown}}$$

in which $R_1$ and $R_2$ each represent a member of the group consisting of hydrogen, alkyl, sulpho-alkyl, aryl, sulpho-aryl, aralkyl and sulpho-aralkyl.

8. Diazotype material containing a diazo component according to claim 2 coated on a support.

9. Diazotype material containing a diazo component according to claim 2 and a coupling component coated on a support.

10. Diazotype material containing a diazo component according to claim 4 coated on a support.

References Cited in the file of this patent

UNITED STATES PATENTS

| | | |
|---|---|---|
| 1,886,480 | Haller et al. | Nov. 8, 1932 |
| 3,033,842 | Holtschmidt | May 8, 1962 |
| 3,039,872 | De Boer et al. | June 19, 1962 |

FOREIGN PATENTS

| | | |
|---|---|---|
| 775,308 | Great Britain | May 22, 1957 |
| 780,591 | Great Britain | Aug. 7, 1957 |